US011036756B2

(12) United States Patent
Bussler et al.

(10) Patent No.: US 11,036,756 B2
(45) Date of Patent: *Jun. 15, 2021

(54) IN-MEMORY KEY-VALUE STORE FOR A MULTI-MODEL DATABASE

(71) Applicant: ORACLE INTERNATIONAL CORPORATION, Redwood Shores, CA (US)

(72) Inventors: Christoph Bussler, Morgan Hill, CA (US); Dieter Gawlick, Palo Alto, CA (US); Weiwei Gong, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/518,114

(22) Filed: Jul. 22, 2019

(65) Prior Publication Data

US 2019/0340183 A1 Nov. 7, 2019

Related U.S. Application Data

(63) Continuation of application No. 14/946,489, filed on Nov. 19, 2015, now Pat. No. 10,360,233.

(51) Int. Cl.
*G06F 16/00* (2019.01)
*G06F 16/25* (2019.01)
*G06F 16/22* (2019.01)

(52) U.S. Cl.
CPC ............ *G06F 16/258* (2019.01); *G06F 16/22* (2019.01)

(58) Field of Classification Search
CPC ................................ G06F 16/258; G06F 16/22
See application file for complete search history.

(56) References Cited

U.S. PATENT DOCUMENTS 7,644,083 B1 * 1/2010 Sirek ................. G06F 17/30498
707/752
8,612,062 B2 * 12/2013 Iino .......................... H02J 3/14
700/22

(Continued)

FOREIGN PATENT DOCUMENTS

| CN | 104750809 | 7/2015 |
| WO | WO 2015/041967 A1 | 3/2015 |

OTHER PUBLICATIONS

Wikipedia, "NoSQL" http://en.wikipedia.org/wiki/NoSQL#Key-value_stores, last viewed on Nov. 19, 2015, 11 pages.

(Continued)

*Primary Examiner* — Jared M Bibbee
(74) *Attorney, Agent, or Firm* — Hickman Becker Bingham Ledesma LLP

(57) ABSTRACT

Techniques related to an in-memory key-value store for a multi-model database are disclosed. In an embodiment, a relational database may be maintained on persistent storage. The relational database may be managed by a database server and may include a database table. The database table may be stored in a persistent format. Key-value records may be generated within volatile memory accessible to the database server by converting data in the database table to a key-value format. The key-value format may be different from and independent of the persistent format. A database statement referencing the database table may be executed based on determining whether to access one or more key-value records in the volatile memory or to access the data in the database table. In response to determining to access the one or more key-value records, the database server may access the one or more key-value records in the volatile memory.

20 Claims, 7 Drawing Sheets

(56) References Cited

U.S. PATENT DOCUMENTS

| | | | |
|---|---|---|---|
| 9,582,603 B1* | 2/2017 | Acharya | G06F 17/30902 |
| 9,870,168 B1* | 1/2018 | Bent | G06F 3/0647 |
| 2009/0063619 A1* | 3/2009 | Chijiiwa | G06F 17/3089 |
| | | | 709/203 |
| 2012/0131038 A1* | 5/2012 | Aronovich | G06F 11/1435 |
| | | | 707/769 |
| 2012/0221768 A1* | 8/2012 | Bagal | G06F 12/0811 |
| | | | 711/103 |
| 2012/0246202 A1* | 9/2012 | Surtani | G06F 17/30569 |
| | | | 707/812 |
| 2013/0162037 A1* | 6/2013 | Kim | H02J 7/0068 |
| | | | 307/24 |
| 2014/0300488 A1* | 10/2014 | Yoo | G01D 4/002 |
| | | | 340/870.02 |
| 2015/0032684 A1* | 1/2015 | Gupta | G06F 17/30575 |
| | | | 707/600 |
| 2017/0147664 A1 | 5/2017 | Bussler | |
| 2017/0163759 A1* | 6/2017 | Acharya | H04L 67/2842 |
| 2018/0095848 A1* | 4/2018 | Aronovich | G06F 11/1435 |

OTHER PUBLICATIONS

Roth et al., "Don't Scrap It, Wrap It! A Wrapper Architecture for Legacy Data Sources", VLDB Conference, dated 1997, 10 pages.

Oracle NoSQL Database, An Oracle White Paper, Oracle, dated Sep. 2011, 12 pages.

Fowler, Adam, "NoSQL for Dummies for Dummies", dated 2015, John Wiley and Sons, Inc., 46 pages.

Bussler, U.S. Appl. No. 14/946,489, filed Nov. 19, 2015, Office Action, dated May 29, 2018.

Bussler, U.S. Appl. No. 14/946,489, filed Nov. 19, 2015, Notice of Allowance, dated Mar. 11, 2019.

Bussler, U.S. Appl. No. 14/946,489, filed Nov. 19, 2015, Interview Summary, dated Feb. 5, 2019.

Bussler, U.S. Appl. No. 14/946,489, filed Nov. 19, 2015, Final Office Action, dated Dec. 26, 2018.

* cited by examiner

FIG. 2

| RELATIONAL DATABASE 200 |||||
|---|---|---|---|---|
| DATABASE TABLE 202 |||||
| FIELD 204 | FIELD 206 | FIELD 208 | FIELD 210 |
| "SALES" | "ALICE SMITH" | FIELD VALUE 212 | "BACHELORS" |
| "RESEARCH" | "BOB ROBERTSON" | FIELD VALUE 214 | "DOCTORATE" |
| "LEGAL" | "CAROL BRADY" | FIELD VALUE 216 | "DOCTORATE" |
| "RESEARCH" | "DAN TUCKER" | FIELD VALUE 218 | "MASTERS" |

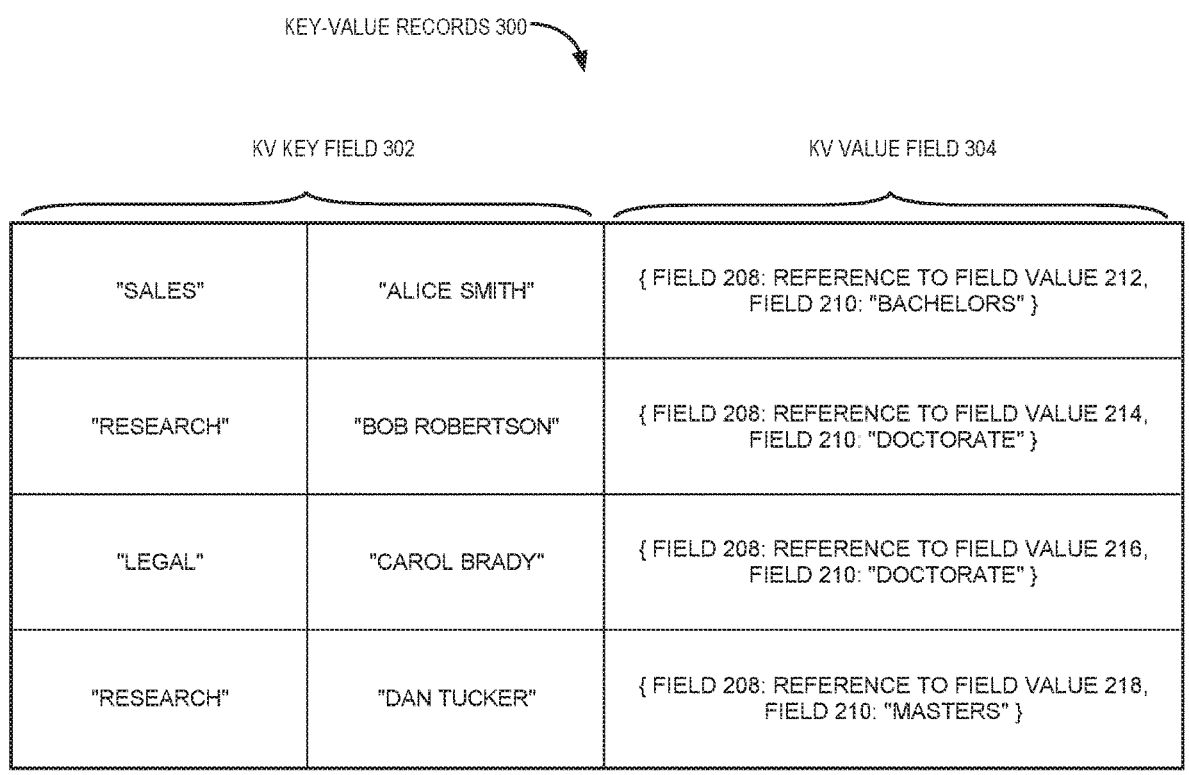

IN-MEMORY KEY-VALUE STORE FOR A MULTI-MODEL DATABASE

PRIORITY CLAIM; RELATED APPLICATION

This application claims the benefit as a continuation of U.S. patent application Ser. No. 14/946,489, filed Nov. 19, 2015, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

Embodiments relate to information retrieval technology and more specifically, to an in-memory key-value store for a multi-model database.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Different data models often trade an advantage in one aspect for a disadvantage in another aspect. For example, a relational data model may exhibit an internal complexity that supports efficient processing of complex queries at the expense of increased latency for even simple queries. In contrast, for example, a key-value data model may offer low latency, high throughput query access for simple queries but may be unable to process complex queries. Thus, it may be beneficial and desirable to maintain data in multiple data models in order to reap the benefits of each data model.

One approach for maintaining data in multiple data models is to implement a dedicated database management system for each different data model. For example, there may be a standalone database management system that only implements and supports a key-value data model and another standalone database management system that only implements and supports a relational data model. However, the overhead involved in maintaining separate database management systems may eliminate any gains made by implementing the separate database management systems. For example, maintaining transactional consistency between data in separate database management systems may involve a data replication implementation that is more complex than the implementation of a key-value database itself.

Thus, there is a need for a new approach to maintaining data in multiple data models that enables exploiting the advantages of each data model while minimizing the disadvantages of each data model.

BRIEF DESCRIPTION OF THE DRAWINGS

In the drawings:
FIG. 2 depicts a detailed view of a relational database, in an example embodiment.
FIGS. 3A-C depict example key-value records.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order. For example, a second database table may be so named although, in reality, it may correspond to a first, second, and/or third database table.

General Overview

A computer may maintain data in multiple data models, one of which is a key-value data model for fast access. Data maintained in the key-value data model (hereinafter "KV data") may be stored in volatile memory, whereas data maintained in a different data model may be persisted to non-volatile memory. In an embodiment, the different data model may be a relational data model.

In a key-value data model, data is stored as a collection of key-value records. Each key-value record includes a key-value pair. A key in the collection is referred to herein as a KV key, and a value associated with the KV key is referred to herein as a KV value. Each KV key uniquely identifies a key-value record and is used to retrieve a corresponding KV value. A KV value may be data that is directly or indirectly referenced by a KV key. For example, a KV value may be a pointer to the location of particular data.

Maintaining data in multiple data models may involve maintaining consistency between the KV data and the data in the different data model. In an embodiment, data changes in one data model may be concurrently made to another data model based on a common language that can be used with either data model. The common language may be a data definition language (DDL) and/or a data manipulation language (DML), such as Structured Query Language (SQL), that is already used with the different data model and that is extended for use with the KV data.

The common language may enable database statements to be processed in parallel for execution on the KV data and/or the data in the different data model. Thus, the computer may determine whether it would be more efficient to access the KV data or the data in the different data model to execute all or part of a database statement.

General Architecture

Figure 1:
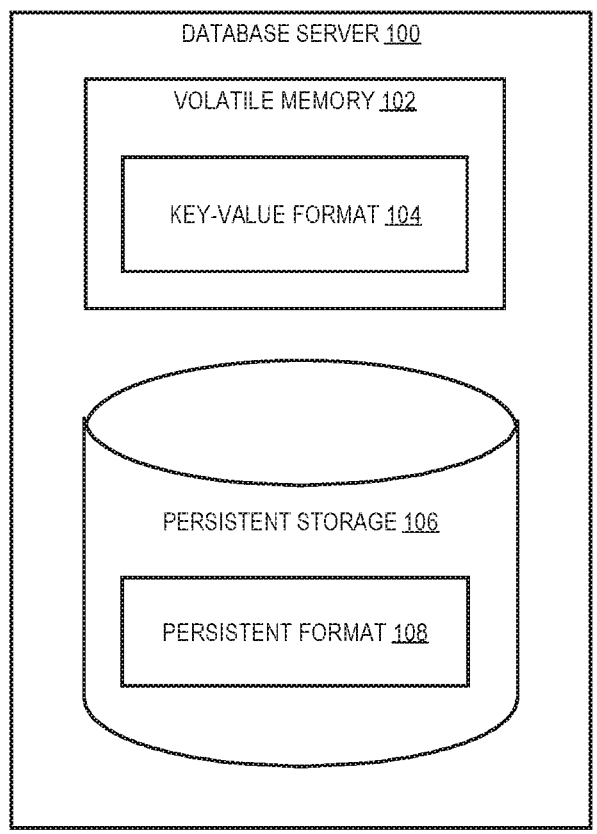
FIG. 1 depicts an example computer architecture on which embodiments may be implemented.

A single database management system may maintain data in multiple data models, including a key-value data model. FIG. 1 depicts an example computer architecture on which embodiments may be implemented. Referring to FIG. 1, database server 100 includes volatile memory 102 and persistent storage 106. Volatile memory 102 stores data in key-value format 104. Persistent storage 106 stores data in persistent format 108.

In an embodiment, the data stored in persistent format 108 may be data stored in a relational data model (hereinafter "REL data"). REL data may be stored in persistent storage 106 as one or more database tables of a relational database. Copies of the REL data may also be cached in volatile memory 102. Hereinafter, REL data and copies of the REL data will collectively be referenced as REL data.

KV data may include a subset (e.g., none, some, all) of the REL data that is stored in key-value format 104. Key-value format 104 may be different from and independent of persistent format 108. As shall be described in greater detail hereafter, KV data may be generated based on REL data. For example, volatile memory 102 may be populated with KV data by performing transformations on REL data. Transformations between REL data and KV data may occur at any of a number of times, such as at start-up, on-demand, after a failure, and/or whenever a data change occurs.

Significantly, the existence of KV data may be transparent to database applications that submit database statements to database server 100. For example, the database applications, which may be designed to interact with database management systems that operate exclusively on REL data, may interact, without modification, with a database management system that maintains both REL data and KV data. Furthermore, transparent to the database applications, the database management system may use the KV data to more efficiently process some or all of the database statements.

Persistent storage 106 generally represents any number of persistent storage devices, such as magnetic disks, solid state drives, flash memory, and/or any other non-volatile memory. Data stored on persistent storage 106 is typically not lost when a failure (e.g., loss of power) occurs.

Volatile memory 102 generally represents the random access memory used by database server 100 and may be implemented by any number of memory devices. Typically, data stored in volatile memory 102 is lost when a failure occurs. Thus, after a failure, data stored on persistent storage 106 may be used to rebuild the data that was lost in volatile memory 102.

Database server 100 may be one or more computers of a database management system. Database server 100 may manage one or more databases. For example, within volatile memory 102, database server 100 may execute database statements that are received from one or more database applications (e.g., clients). The database statements may reference one or more databases managed by database server 100.

Relational Format Data

In an embodiment, REL data may be data in one or more database tables of a relational database. FIG. 2 depicts a detailed view of a relational database, in an example embodiment. Referring to FIG. 2, relational database 200 includes database table 202. Database table 202 includes fields 204, 206, 208, 210. Field 208 includes field values 212-218.

Fields 204, 206, 208, 210 may include field values that, alone or in combination, uniquely identify a database object. For example, fields 204, 206, 208, 210 may include indices and/or alphanumeric strings that are unique to a particular record (e.g., a row, a column) of a database table 202. A subset of the fields 204, 206, 208, 210 may be included in a primary key for a database table 202. In the example of FIG. 2, fields 204 and 206 may refer to a department name and a user name, respectively, and either or both may be used to identify certain employees of a company. However, if field 204 alone is used to identify certain employees, a single field value (e.g., "Research") may identify more than one employee.

Fields 204, 206, 208, 210 may store any number of different data types, such as strings, integers, and Binary Large Objects (BLOBs). For example, field values 212-218 may be images or audio recordings stored in database table 202. As shall be described in greater detail hereafter, a KV key field and a KV value field may each include a respective subset of the fields 204, 206, 208, 210 in a relational database table 202.

A relational database 200 may include a database dictionary for management of the relational database 200. The database dictionary may include database metadata that defines database objects physically or logically contained in the relational database 200. Database objects may include database tables, columns, indices, data types, database users, user privileges, storage structures used for storing database object data, and logical database objects, such as schemas, applications, and modules. The database dictionary may be modified according to DDL commands issued to add, modify, or delete database objects.

Key-Value Option

KV data may include any subset of REL data. For example, a KV key field may consist of field 206, and a KV value field may consist of field 210. In another example, a KV key field may include fields 204 and 206, and a KV value field may include fields 208 and 210.

In an embodiment, a DDL statement may specify particular REL data that is to be available as KV data. Hereinafter, REL data that is available as KV data shall be referenced as "KV option-enabled". The KV option-enabled data may be specified at any level of granularity. For example, KV option-enabled data may be specified at least at the following levels of granularity:

- all of a relational database 200
- specified database tables 202
- specified columns
- specified rows For example, database table 202 may be specified as KV option-enabled by issuing to database server 100 the DDL statement "ALTER TABLE 'database table 202' KEY-VALUE". Database metadata may indicate that certain REL data is KV option-enabled. Enabling the KV option for a particular subset of REL data provides database server 100 with the option of accessing either REL data or KV data in response to a database statement.

Database server 100 may also switch off the KV option for KV option-enabled database table 202 in response to the DDL statement "ALTER TABLE 'database table 202' NO KEYVALUE". Additionally or alternatively, database server 100 may manage volatile memory 102 according to an eviction policy. The eviction policy may cause removing particular KV data based on a predetermined time period that has elapsed since the particular KV data was last accessed, based on an amount of available resources, and/or any other metric suitable for efficient memory management. Thus, the KV option may be configured to adapt to changes in performance and resource usage needs.

Key-Value Format Data

Figure 3A:
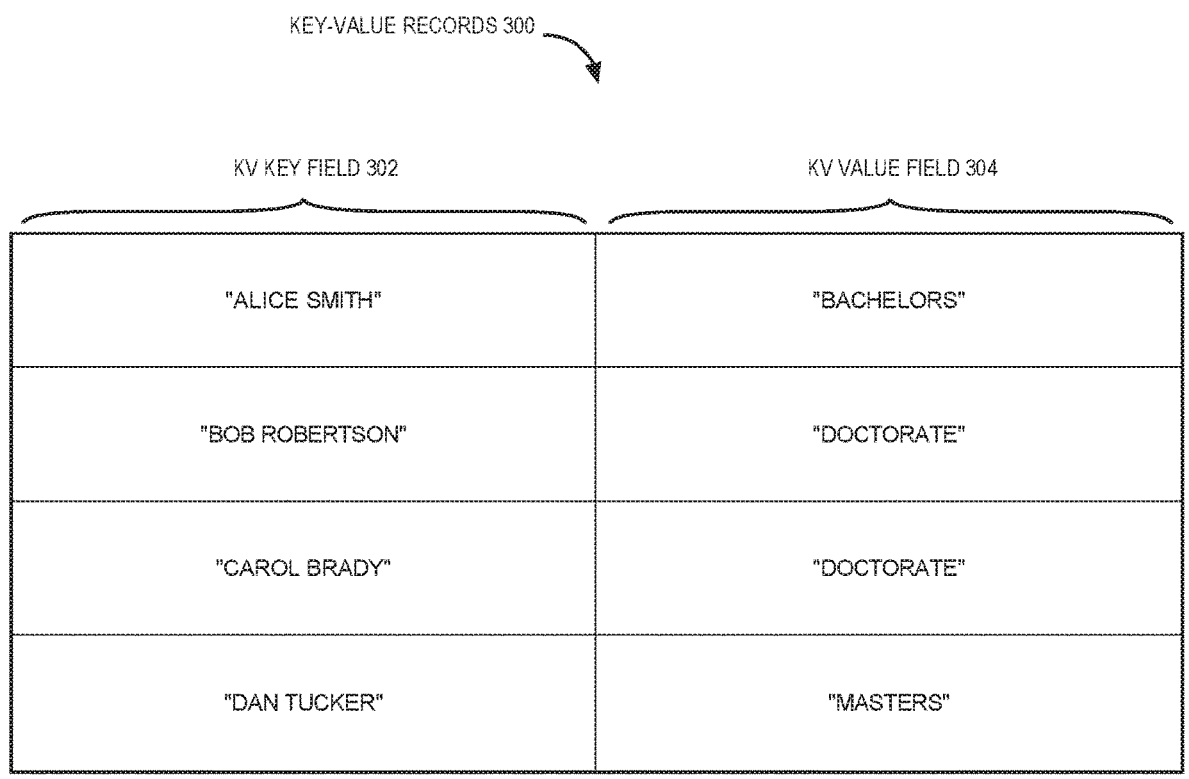

FIG. 3A depicts relatively simple examples of key-value records. Key-value records 300 may be organized into two main parts. One part corresponds to a KV key field 302 that includes KV keys that uniquely identify key-value records 300. Another part corresponds to a KV value field 304 that includes KV values that are retrieved, for example, when a particular key-value record 300 is identified. Referring to FIG. 3A, KV key field 302 includes field 206 of database table 202, and KV value field 304 includes field 210 of database table 202.

Faster lookup times for REL data may be achieved based on transforming a subset of REL data into KV data. Transforming REL data into KV data may include defining KV data based on REL data and/or propagating changes from REL data to KV data. For example, KV data may be defined according to DDL statements issued to database server 100, and KV data may be modified according to DML statements issued to database server 100. In response to the DDL and/or DML statements, the database server 100 may generate KV data according to the specified transformations.

In an embodiment, a database server 100 may automatically define KV key field 302. Thus, specifying data to be included in and/or excluded from a KV key field 302 may be unnecessary. For example, a database server 100 may be configured to automatically copy primary keys of a relational database table 202 into a KV key field 302. However, this default configuration may be overridden. In the example of FIG. 3A, the DDL statement "ALTER TABLE 'database table 202' KEYVALUE ALTERNATE KEY ('field 206')" may have been issued to define field 206 as KV key field 302.

Similarly, for a KV value field 304, a database server 100 may be configured to automatically copy and/or otherwise reference fields 204, 206, 208, 210 that are not included in the primary keys of relational database tables. However, specifying data to be included in and/or excluded from a KV value field 304 may be desirable for efficient memory management and efficient data retrieval. Thus, in the example of FIG. 3A, KV value field 304 may have been generated based on the DDL statement "ALTER TABLE 'database table 202' KEYVALUE NO KEYVALUE ('field 208')".

Key-value records 300 may be stored as one or more tables (hereinafter "KV tables"). Relational database tables may have a one-to-one and/or a many-to-one correspondence with KV tables. For example, each relational database table 202 may be transformed into a separate KV table. Additionally or alternatively, multiple relational database tables may be transformed into a single KV table based on performing, for example, a SQL JOIN operation.

Composite KV Keys

Figure 3B:
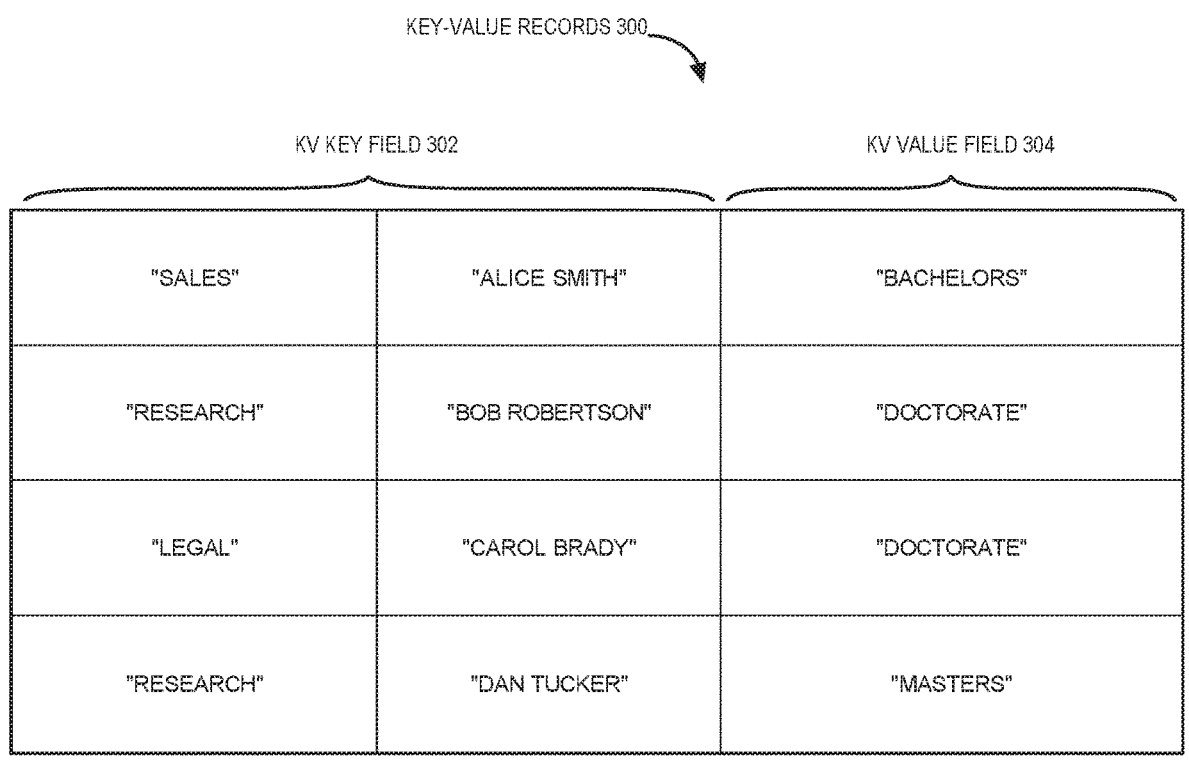

FIG. 3B depicts example key-value records 300 with composite KV keys. A composite KV key field comprises field values from two or more fields in REL data. Referring to FIG. 3B, KV key field 302 includes fields 204 and 206 of database table 202. KV value field 304 includes field 210 of database table 202.

Thus, KV key field 302 is a composite KV key field that includes field values from multiple fields of a relational database table 202. Each component field of a KV key field 302 includes field values that are referred to herein as partial KV keys.

According to an embodiment, a partial KV key may be used to access KV data or REL data. This is called partial KV key access. Partial KV key access enables retrieving multiple KV values from multiple records in response to a single database statement. A single database statement may be a query with a predicate that specifies one or more partial KV keys. For example, the SQL query "SELECT 'field 210' FROM 'database table 202' WHERE 'field 204'='Research'" specifies an exact match on the partial KV key "Research". In the example of FIG. 3B, the partial KV key "Research" is found in both the second and fourth key-value records 300, which contain the KV values "Doctorate" and "Masters". Thus, a result set including both "Doctorate" and "Masters" is returned in response to the query.

In the example of FIG. 3B, KV key field 302 is depicted as encompassing fields 204 and 206 as separate partial KV key fields. However, in an embodiment, KV key field 302 may include an aggregation of multiple fields into a single field. For example, a KV key field 302 may include the composite KV key "Sales, Alice Smith", which is an aggregation of two partial KV keys from two different fields. The partial KV key "Sales" corresponds to component field 204, and the partial KV key "Alice Smith" corresponds to component field 206. Either or both of the partial KV keys in the aggregation may be referenced in order to access certain key-value records 300.

Composite KV Values

FIG. 3C depicts example key-value records 300 with composite KV values. A composite KV value field comprises field values from two or more fields in REL data. Referring to FIG. 3C, KV key field 302 includes fields 204 and 206 of database table 202. KV value field 304 includes a composite of fields 208 and 210.

Thus, KV value field 304 is a composite KV value field that includes field values from multiple fields of a relational database table 202. Each component field of a KV value field 304 includes field values that are referred to herein as partial KV values.

Partial KV values may be used to store a rich data set in a KV value field 304. Some or all of the rich data set may be retrieved in response to a database statement. The database statement may be a query that specifies at least part of a composite KV value in a query predicate. Referring to the example key-value records 300 of FIG. 3C, the SQL query "SELECT 'field 210' FROM 'database table 202' WHERE 'field 206'='Alice Smith'" would specify component field 210 of KV value field 304. Thus, the partial KV value "Bachelors" may be retrieved in response to the SQL query. This is partial KV value retrieval.

In an embodiment, KV value field 304 may encompass multiple fields that are maintained as separate partial KV value fields. However, in the example of FIG. 3C, KV value field 304 is depicted as an aggregation of multiple fields into a single field. For instance, "{field 208: reference to field value 212, field 210: 'Bachelors' }" is a composite of two partial KV values from two component fields.

Indexing Key-Value Format Data

Partial KV key access and partial KV value retrieval may enable efficient memory management. Multiple KV tables may be consolidated into a single KV table that can handle database statements for each of the multiple KV tables. For example, any database statements that can be executed on the KV table in FIG. 3A can also be executed on the KV table in FIG. 3B. However, adding a partial KV key field to the KV table in FIG. 3A involves a smaller memory space than maintaining a separate KV table that includes duplicate data.

Partial KV key access and partial KV value retrieval may be supported by indexing partial KV keys and/or partial KV values. A database server 100 may be configured to automatically index each key-value record 300 (e.g., based on automatically indexing a KV key field 302). However, it is unnecessary for indices on KV tables to correspond to indices on relational database tables.

For example, to specify that the same indices defined on REL data are to be added to KV data, database server 100 may be issued the DDL statement "ALTER TABLE 'database table 202' KEYVALUE KEEP INDEXES". Alternatively, to specify that certain indices defined on REL data are to be added to KV data, database server 100 may be issued the DDL statement "ALTER TABLE 'database table 202' KEYVALUE KEEP INDEXES ('index1', 'index2')". Alternatively, to specify that no indices defined on REL data are to be added to KV data, database server 100 may be issued the DDL statement "ALTER TABLE 'database table 202' KEYVALUE NO INDEXES".

Additionally or alternatively, a user may specify a particular portion of KV data to be indexed. For example, database server 100 may be issued the DDL statement "ALTER TABLE 'database table 202' KEYVALUE ADD INDEX ('field 210')". In response to the DDL statement, database server 100 generates an index indexing values of field 210.

Aggregating KV Data

Composite KV keys and/or composite KV values may be stored as a serialization of field values. The serialization may be in any format, such as JavaScript Object Notation (JSON), Extensible Markup Language (XML), and comma-separated values (CSV). The format may be specified by a DDL and/or DML statement.

For example, a KV value field 304 may be generated based on issuing to database server 100 the DDL statement "ALTER TABLE 'database table 202' KEYVALUE value AS TRANSFORM JSON ('field 208', 'field 210')". Thus, field values from fields 208 and 210 may be stored as JSON objects. FIG. 3C depicts some examples of JSON objects resulting from this example DDL statement.

In an embodiment, a key-value record 300 may be generated based on serializing KV keys and KV values. For example, database server 100 may be issued the DDL statement "ALTER TABLE 'database table 202' KEYVALUE value AS TRANSFORM JSON ('field 204', 'field 206', 'field 208', 'field 210')". Indexing may be performed on all or part of a serialization of KV data.

Aggregating KV data may also involve other transformations, such as data type transformations. Data type transformations convert field values from one data type (e.g., integers) into another data type (e.g., strings). Data type transformations may be used in conjunction with serialization. For example, an integer may be converted into a string to enable string concatenation with another field value.

Additionally or alternatively, aggregating KV data may involve generating virtual fields. Virtual fields may include KV data that does not exactly match REL data. For example, although REL data may include "Sales" and "Alice Smith" as separate field values, REL data does not include, in it entirety, the field value "Sales_Alice Smith", which may be generated for inclusion in KV data. Virtual fields may be generated based on performing one or more operations on REL data. For example, a virtual field containing "Sales_Alice Smith" may be generated based on concatenating fields 204 and 206 containing "Sales" and "Alice Smith" as well as using an underscore character as a delimiter.

Additionally or alternatively, aggregating KV data may involve executing database statement for transforming and/or generating KV data. For example, a database statement may be executed to retrieve REL data to be aggregated into KV data. This can be particularly useful if the retrieved REL data is stored in a separate database table 202 from the REL data with which it is to be aggregated. In this case, a SQL JOIN operation may be involved.

Structure of KV Key Fields and KV Value Fields

As mentioned previously, an important feature of KV data is that it may be accessed or modified using the same language used with REL data. For example, the SQL query "SELECT 'field 210' FROM 'database table 202' WHERE 'field 206'='Alice Smith'" may be executed on either relational database 200 or key-value records 300. Since the query avoids excluding REL data or KV data from consideration, a database server 100 has the option of accessing REL data and/or KV data to execute the query.

Thus, different labels for KV data and REL data are unnecessary for accessing data. For example, labeling KV key field 302 as "key" and KV value field 304 as "value" would enable a query to reference those labels, but doing so would deprive database server 100 of the option of executing the query over REL data if it would be more efficient. However, such labels may be useful for transforming REL data into KV data. For example, a DDL statement may reference the label "value" when aggregating REL data into a KV value field 304. In other words, such labels may be maintained by a database server 100 as internally used references for KV data.

KV data may be stored using any of a number of representations. At a minimum, KV keys may be stored in a B-tree, a hash table, or any other representation that enables fast lookups. Each KV key may refer to a representation of a KV value, which does not have to be stored in any specific type of representation.

Processing Database Statements

When a database server 100 receives a database statement referencing REL data, the database server 100 analyzes the database statement and determines a plan for executing the database statement on the REL data with optimal efficiency. The process of analyzing a database statements and determining an execution plan is referred to herein as a "statement optimization". According to an embodiment, a statement optimization determines whether it would be more efficient to access REL data or KV data in response to a particular database statement.

An efficiency determination may depend on a variety of factors, including availability of KV data. For example, some REL data may be available as KV data, whereas other REL data is only available as REL data. For the REL data that is available as KV data, it would be faster to access the KV data than to access REL data in persistent storage 106. For the REL data that is unavailable as KV data, it may be faster to access even REL data in persistent storage 106 than to first transform the REL data into KV data and then access the KV data.

Even if KV data is available for a particular database statement, the efficiency determination may be further complicated by other considerations. Typically, executing a database statement on KV data instead of REL data is faster when interpreting (e.g., parsing, analyzing) contents of aggregated KV data is unnecessary. For example, if an entire JSON object is returned in response to a query, accessing KV data will be faster than accessing REL data. However, if a specific name-value pair of the JSON object is to be returned in response to a query, whether accessing KV data is faster than accessing REL data may depend on any of a variety of factors.

Figure 4:
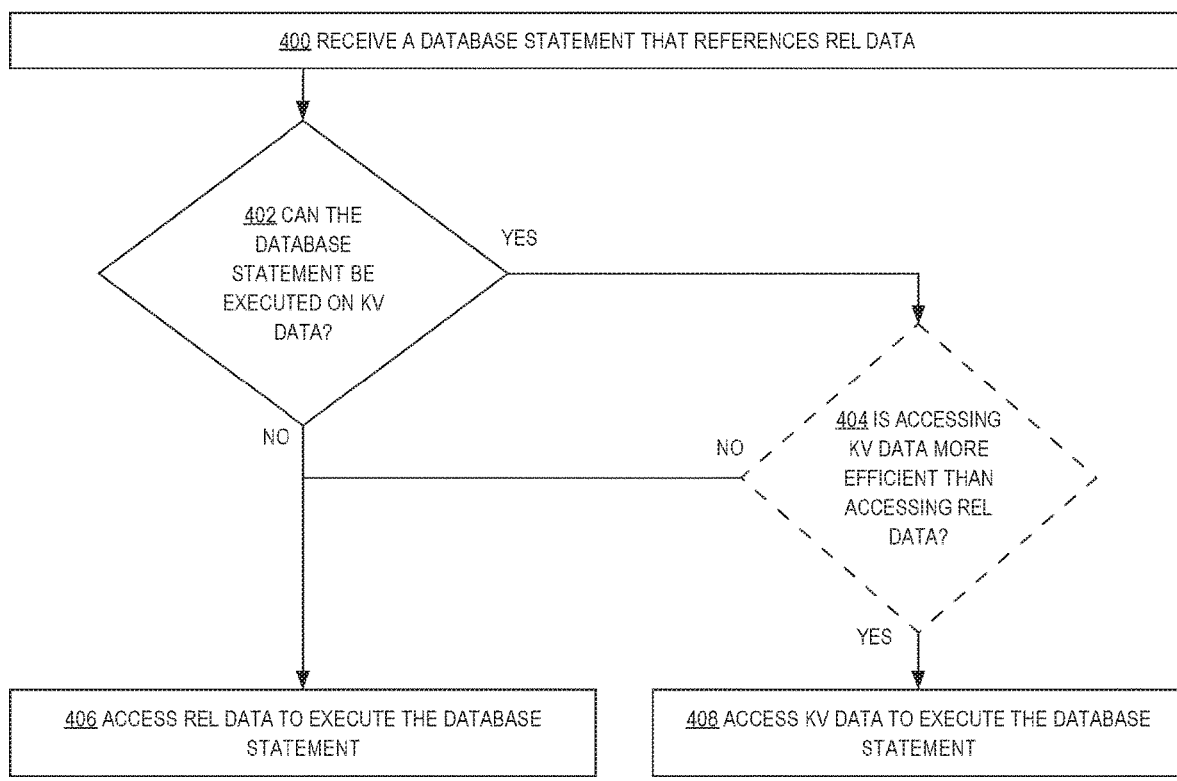
FIG. 4 is a flow diagram that depicts an approach for processing database statements at a multi-model database.

FIG. 4 is a flow diagram that depicts an approach for processing a database statement at a multi-model database. At block 400, a database server 100 receives a database statement that references REL data. The database statement may be executed using SQL or an application programming interface (API) that enables bypassing SQL (hereinafter "direct access API"). For example, if KV key fields are known, it would be possible to directly access KV data in volatile memory 102 to return KV values that correspond to KV keys received by the direct access API.

Determining KV Option-Enabled Data

At block 402, the database server 100 determines whether it is possible to execute the database statement on KV data. For example, a statement optimization may analyze the database statement to determine whether it involves KV option-enabled data. In other words, the statement optimization may determine whether the database statement references at least part of a KV key field 302 and/or at least part of a KV value field 304. This determination may involve parsing the database statement for names of fields 204, 206, 208, 210. This determination may also involve a catalog lookup of these names, for example, in a database dictionary.

If the database server 100 is unable to execute the database statement on KV data, block 402 proceeds to block 406. Otherwise, block 402 may proceed to optional block 404 for further analysis.

Further Efficiency Analysis

At block 404, the database server 100 determines whether accessing the KV data would be more efficient than accessing REL data for various parts of the database statement. This determination may be based on any of a number of different factors, including the following:

Accessing KV data involves interpreting field values.

KV data includes data types and data representations that are known and supported.

KV data includes indirect references to corresponding REL data.

The location of REL data and/or the location of KV data.

In an embodiment, if the database statement references any partial KV keys and/or partial KV values that are maintained as aggregated data (e.g., serialized data), the database statement may undergo further optimization analysis to determine whether KV data or REL data should be accessed to execute the database statement. However, if interpreting aggregated data is unnecessary, accessing KV data may be more efficient, and block 404 may proceed to block 408.

In an embodiment, if any of the aggregated data includes data types (e.g., strings, integers) and/or data representations (e.g., JSON, XML, CSV) that are unknown or unsupported, then block 404 may proceed to block 406. Otherwise, block 404 may proceed to block 408. For example, if an unsupported serialization format is used for the KV value field 304, parsing composite KV values and locating relevant partial KV values may be slower than accessing REL data.

In an embodiment, if KV data includes indirect references (e.g., pointers) to REL data, then block 404 may proceed to block 406. Otherwise, block 404 may proceed to block 408. For example, if executing a database statement on KV data will involve resolving a memory address corresponding to REL data, it may be more efficient to access REL data directly. In FIG. 3C, KV value field 304 includes KV values that contain references to REL data. When such KV values are retrieved, a second access may occur to resolve the references into the REL data. Depending on when the second access occurs, it may be more efficient to access REL data. For example, if the second access automatically occurs when the KV value is constructed in volatile memory 102, it may be more efficient to access KV data. However, if the second access automatically occurs when the KV value is accessed, it may be more efficient to access REL data. The efficiency determination may be further complicated by recursive references.

In an embodiment, the location of REL data and/or the location of KV data may be used to determine whether to access KV data or REL data. For example, if relevant REL data exists in a cache, it may be more efficient to access REL data than KV data. As another example, if relevant data is stored locally in one format and stored remotely (e.g., in a distributed database) in another format, it may be more efficient to access the relevant data in the format that is stored locally.

At block 406, the database server 100 accesses REL data to execute the database statement, and at block 408, the database server 100 accesses KV data to execute the database statement. If any parts of the database statement remain to be analyzed, block 406 and/or block 408 may return to block 404.

Complexity of Efficiency Analysis

In an embodiment, the efficiency analysis may consist of block 402 so that the more computationally expensive and time consuming analysis at block 404 is avoided. Thus, at block 402, the database server 100 may simply determine whether all of the REL data referenced in a database statement is KV option-enabled. If so, block 402 proceeds directly to block 408. This embodiment increases the efficiency of processing dynamically generated (e.g., in real time) database statements.

In an embodiment, a thorough efficiency analysis may include block 404 in addition to block 402. Although this embodiment ensures optimal efficiency in executing database statements, there is overhead associated with such a thorough analysis. Thus, this embodiment is ideally suited for prepared statements (e.g., database statements that are pre-compiled).

Compression

In an embodiment, KV data may be stored in volatile memory 102 in a compressed format. However, different portions of KV data may be compressed in different ways and/or to different degrees. For example, KV data that is accessed frequently may be uncompressed or lightly compressed, whereas KV data that is accessed infrequently may be highly compressed.

Based on various factors, database server 100 may automatically determine one or more compression algorithms (e.g., dictionary-based compression, run-length encoding, zip compression) and/or a respective level of compression used by each compression algorithm. The various factors may include access frequency, data size, data priority, and/or available memory. For example, a small amount of available memory and a large data size may result in a high level of compression.

Additionally or alternatively, a user may specify the one or more compression algorithms and/or a respective level of compression used by each compression algorithm. A DDL may be extended to support compression hints that are specified by the user. For example, KV data for database table 202 may be compressed for all queries based on issuing to database server 100 the database statement "ALTER TABLE 'database table 202' KEYVALUE MEMCOMPRESS FOR QUERY". Additional options may include "FOR DML" (i.e., for all DML database statements), "FOR QUERY LOW/HIGH" (i.e., for low/high query access frequency), and/or "FOR CAPACITY LOW/HIGH" (i.e., for low/high amount of available memory). Compression may also be switched off based on issuing to database server 100 the database statement "ALTER TABLE 'database table 202' KEYVALUE NO MEMCOMPRESS".

Additionally or alternatively, the user may provide runtime hints that specify how quickly to load certain KV data into volatile memory 102. For example, database server 100 may be issued the database statement "ALTER TABLE 'database table 202' KEYVALUE PRIORITY LOW". Additional options may include "NONE", "MEDIUM", "HIGH", and/or "CRITICAL". However, database server 100 may ultimately decide when to load certain KV data and how quickly to do it. In an embodiment, the user may specify when to load and/or unload KV data. For example, "PRIORITY NONE" may indicate that database server 100 should wait for user directives instead of loading KV data automatically. Thus, a database application may invoke database server 100 and specify loading and/or unloading of KV data.

Additionally or alternatively, memory space for KV data may be allocated based on system parameters that are specified by a user. For example, 125 GB in volatile memory 102 may be set aside for KV data based on issuing to database server 100 the database statement "ALTER SYSTEM SET keyvalue_size 125 GB".

Compressed KV data may be organized, within volatile memory 102, into compression units. Each compression unit may store a different set of KV data. For example, KV data may be organized into compression units based on different tables, different table partitions, different rows, different columns, etc. A KV data-to-compression unit mapping may be stored in volatile memory 102 as metadata that indicates which KV data is contained in each compression unit. In a distributed database system, the KV data-to-compression unit mapping may also indicate which database server stores a particular compression unit. Because it is typically more efficient to access local data than to obtain data from a remote location, the location of KV data may affect the determination of whether to access KV data or REL data.

In an embodiment, decompressing KV data prior to accessing the KV data may be unnecessary. For example, vector processing operations may be performed directly on compressed KV data. In another example, compressed KV data may be decompressed on-chip after the compressed KV data has been transferred to the CPU.

Maintaining Transactional Consistency

Transactional consistency between REL data and KV data may be maintained based on any of a number of consistency models. For example, transactional consistency may be maintained between different data formats using any of the techniques described in U.S. patent application Ser. No. 14/337,164, filed Jul. 21, 2014; U.S. patent application Ser. No. 14/337,142, filed Jul. 21, 2014; U.S. patent application Ser. No. 14/337,045, filed Jul. 21, 2014; U.S. patent application Ser. No. 14/337,182, filed Jul. 21, 2014; U.S. patent application Ser. No. 14/337,179, filed Jul. 21, 2014; and U.S. patent application Ser. No. 14/819,016, filed Aug. 5, 2015, the entire contents of each of which are incorporated herein by reference. In an embodiment, an synchronous consistency model may be implemented. In an embodiment, an asynchronous consistency model may be implemented based on maintaining multiple versions of data.

Change propagation may involve transforming REL data changes into KV data. Change propagation may be available at all times or on-demand. For example, data changes may be immediately propagated whenever the data changes occur or may be propagated in batches at predetermined times, such as when a predetermined amount of changes have occurred, at regular intervals, or in preparation for an expected need.

In an embodiment, a transaction manager (e.g., an online transaction processing server) of a database management system may be configured to concurrently update REL data and KV data. For example, if a KV value contains a reference to REL data and if dereferencing occurs when the KV value is constructed in volatile memory 102, changes to referenced REL data may be tracked to ensure consistency between the REL data and KV data. As mentioned above, a DDL and/or a DML associated with REL data may be extended for use with KV data. Thus, the same database statement may concurrently update both the REL data and the KV data. For example, updates to REL data may be propagated to KV data based on transforming the updates into KV data.

Although updates may be immediately incorporated into decompressed and/or uncompressed data, it may be necessary to delay incorporating updates into compressed data. However, consistency may be maintained by recording updates in change logs and bitmaps that are stored in volatile memory 102. Recording updates enables the updates to be incorporated at a time when it is convenient for the data to be decompressed, thereby avoiding the overhead of decompressing and re-compressing the data each time a change occurs.

Change logs may, within volatile memory 102, store information about updates yet to be reflected in compressed data. The change logs may include the changed data, a timestamp for the change, and/or a transaction identifier. A change log may be a global change log or a private change log. Global change logs may store committed transactions and may be accessible to all processes. Private change logs may store uncommitted transactions and may be accessible only to a particular transaction. When a transaction commits, information stored in the private change log for the transaction may be moved to one or more global change logs, where a commit timestamp for the transaction may also be stored. Information in the global change logs may be incorporated into the compressed data (e.g., KV data) at any of a number of times, such as a time that is convenient for the compressed data to be decompressed.

Bitmaps may maintain, within volatile memory 102, version control information. Instead of incorporating changes as they occur, each time a data item is changed, a bit corresponding to the data item may be flipped in the bitmap. When changes are eventually incorporated (e.g., into KV data), the bitmap may be reset, and a version identifier (e.g., a timestamp for the change incorporation) may be associated with the bitmap. Bitmaps may be dynamically allocated in such a manner that minimizes memory space that is wasted by storing bits that remain unflipped. Bitmaps may be organized based on a hierarchy of data units (e.g., rows, columns, blocks, extents, and/or segments) in such a manner that data items may be efficiently searched (e.g., binary search).

Additionally or alternatively, the cycle of decompressing, changing, and re-compressing KV data may be avoided based on transforming corresponding REL data into KV data that has been updated and compressed. For example, the corresponding REL data may be cached data that is uncompressed. The cached data may be converted into KV data that corresponds to updated REL data.

Compatibility with Other Database Features

At least the aforementioned techniques related to maintaining KV data at a multi-model database should be compatible with any other features of the multi-model database. For example, database server 100 may be issued a DDL statement that causes KV data to be stored in a columnar format in volatile memory 102. As another example, SQL extensions (e.g., JSON extensions, XML extensions) should be available to both REL data and KV data. In other words, KV data should seamlessly integrate with all functionalities of a database management system.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
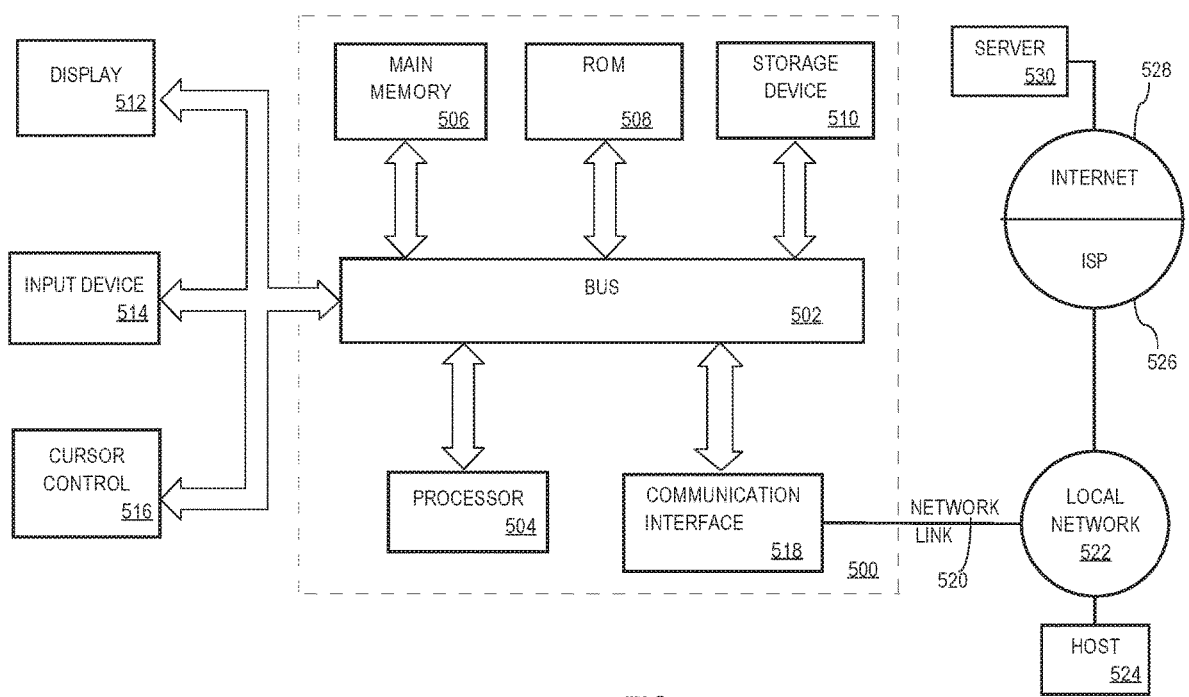
FIG. 5 depicts a computer system upon which an embodiment may be implemented.

For example, FIG. 5 is a block diagram that depicts a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
maintaining, on persistent storage, a relational database that is managed by a database server;
wherein said relational database includes a database table, said database table being stored on said persistent storage in a persistent format;
generating, within volatile memory accessible to said database server, key-value records by converting data in said database table to a key-value format;
wherein said key-value format is different from and independent of said persistent format;
executing a database statement that includes a FROM clause that references said database table, wherein executing said database statement comprises:
determining whether to access one or more key-value records in said volatile memory or to access said data in said database table;
accessing one or more key-value records in said volatile memory when determining to access said one or more key-value records.

2. The method of claim 1, wherein generating, within said volatile memory accessible to said database server, said key-value records by converting said data in said database table to said key-value format comprises:
performing a join operation on said database table and another database table of said relational database; and
wherein said one or more key-value records includes data from said database table and data from said another database table.

3. The method of claim 1, wherein generating, within said volatile memory accessible to said database server, said key-value records by converting said data in said database table to said key-value format comprises:
maintaining, by said database server within said volatile memory, said key-value records transactionally consistent with said data in said database table as said database server executes database operations that make changes to said data in said database table.

4. The method of claim 1, wherein generating, within said volatile memory accessible to said database server, said key-value records by converting said data in said database table to said key-value format comprises:
generating a key field of said key-value records, wherein said key field includes multiple fields of said database table.

5. The method of claim 1, wherein generating, within said volatile memory accessible to said database server, said key-value records by converting said data in said database table to said key-value format comprises:
generating a value field of said key-value records, wherein said value field includes multiple fields of said database table.

6. The method of claim 5, wherein generating said value field of said key-value records comprises:
for each key-value record of said key-value records, storing, in said value field, respective field values of said multiple fields as a serialization of field values.

7. The method of claim 5, wherein generating said value field of said key-value records comprises:
indexing at least two fields of said multiple fields.

8. The method of claim 1, wherein determining whether to access one or more key-value records in said volatile memory or to access said data in said database table comprises:
determining whether accessing said one or more key-value records involves interpreting one or more field values.

9. The method of claim 1, wherein determining whether to access one or more key-value records in said volatile memory or to access said data in said database table comprises:
determining whether said one or more key-value records include indirect references to corresponding data in said database table.

10. The method of claim 1, wherein generating, within said volatile memory accessible to said database server, said key-value records by converting said data in said database table to said key-value format comprises:

storing references to one or more field values of said database table.

11. One or more non-transitory storage media storing instructions which, when processed by one or more computing devices, cause:
   maintaining, on persistent storage, a relational database that is managed by a database server;
   wherein said relational database includes a database table, said database table being stored on said persistent storage in a persistent format;
   generating, within volatile memory accessible to said database server, key-value records by converting data in said database table to a key-value format;
   wherein said key-value format is different from and independent of said persistent format;
   executing a database statement that includes a FROM clause that references said database table, wherein executing said database statement comprises:
      determining whether to access one or more key-value records in said volatile memory or to access said data in said database table;
      accessing one or more key-value records in said volatile memory when determining to access said one or more key-value records.

12. The one or more non-transitory storage media of claim 11, wherein generating, within said volatile memory accessible to said database server, said key-value records by converting said data in said database table to said key-value format comprises:
   performing a join operation on said database table and another database table of said relational database; and
   wherein said one or more key-value records includes data from said database table and data from said another database table.

13. The one or more non-transitory storage media of claim 11, wherein generating, within said volatile memory accessible to said database server, said key-value records by converting said data in said database table to said key-value format comprises:
   maintaining, by said database server within said volatile memory, said key-value records transactionally consistent with said data in said database table as said database server executes database operations that make changes to said data in said database table.

14. The one or more non-transitory storage media of claim 11, wherein generating, within said volatile memory accessible to said database server, said key-value records by converting said data in said database table to said key-value format comprises:
   generating a key field of said key-value records, wherein said key field includes multiple fields of said database table.

15. The one or more non-transitory storage media of claim 11, wherein generating, within said volatile memory accessible to said database server, said key-value records by converting said data in said database table to said key-value format comprises:
   generating a value field of said key-value records, wherein said value field includes multiple fields of said database table.

16. The one or more non-transitory storage media of claim 15, wherein generating said value field of said key-value records comprises:
   for each key-value record of said key-value records, storing, in said value field, respective field values of said multiple fields as a serialization of field values.

17. The one or more non-transitory storage media of claim 15, wherein generating said value field of said key-value records comprises:
   indexing at least two fields of said multiple fields.

18. The one or more non-transitory storage media of claim 11, wherein determining whether to access one or more key-value records in said volatile memory or to access said data in said database table comprises:
   determining whether accessing said one or more key-value records involves interpreting one or more field values.

19. The one or more non-transitory storage media of claim 11, wherein determining whether to access one or more key-value records in said volatile memory or to access said data in said database table comprises:
   determining whether said one or more key-value records include indirect references to corresponding data in said database table.

20. The one or more non-transitory storage media of claim 11, wherein generating, within said volatile memory accessible to said database server, said key-value records by converting said data in said database table to said key-value format comprises:
   storing references to one or more field values of said database table.

* * * * *